United States Patent

[11] 3,540,665

| [72] | Inventor | Nicolaas Snoek |
| --- | --- | --- |
| | | Herzogsingel 39, Haarlem, Netherlands |
| [21] | Appl. No. | 725,602 |
| [22] | Filed | May 1, 1968 |
| [45] | Patented | Nov. 17, 1970 |
| [32] | Priority | May 2, 1967 |
| [33] | | Netherlands |
| [31] | | No. 6706176 |

[54] SCRAP BREAKING DEVICE
5 Claims, 2 Drawing Figs.
[52] U.S. Cl. .................................................. 241/73, 241/82, 241/186
[51] Int. Cl. .................................................. B02c 13/04, B02c 13/13
[50] Field of Search .......................................... 241/73, 82, 97, 186, 223, 81

[56] References Cited
UNITED STATES PATENTS
2,368,331  1/1945  Seaman ........................ 241/82X Primary Examiner—Theron E. Condon
Assistant Examiner—Donald G. Kelly
Attorney—Marshall & Yeasting ABSTRACT: The device has a supply passage for the scrap, below which is a rotor which is provided with hammers and rotates around a horizontal axis. A semicylindrical grid is located below the rotor, and a discharge passage for the broken scrap is located below the grid. A horizontal supply conveyor extends into the supply passage and terminates in a discharge end located above the level of the rotor, and a circulating passage extends laterally from the supply passage above the supply conveyor. A second grid extends below the circulating passage and above the supply conveyor to separate the pieces which are large enough to be thrown by the rotor upon and to be retained by the second grid from the pieces which are thrown only high enough to fall upon the supply conveyor.

Patented Nov. 17, 1970

3,540,665

SCRAP BREAKING DEVICE

BACKGROUND OF THE INVENTION

The invention relates to a scrap breaking device having a supply passage for the scrap to be broken situated above a rotor provided with hammers and rotating around a horizontal axis and a semicylindrical shaped grid below this rotor, which device is provided with a discharge passage for the broken scrap.

In known scrap breaking devices a separate outlet passage has been provided besides a supply passage, which supply passage has been situated above the semicylindrical grid. The outlet passage has been arranged in order to remove scrap which cannot be broken in such a manner that it will fall through the semicylindrical grid. A spring-tensioned flap has been situated between the breaking space and the outlet passage, which flap can give way when heavy pieces of the scrap which are not already broken strike against the flap. The spring-tensioned flap will deflect parts of the scrap into the breaking space, when these parts strike against the flap owing to which the scrap is subjected to the breaking action again. The parts of the scrap which cannot be broken any more will be removed out of the breaking space when the spring-tensioned flap gives way and frees the passage to the outlet.

Such a known device has a drawback that objects which could be broken will come into the outlet when the flap gives way to the outlet passage, whereas large objects which will not pass the flap cannot be discharged from the breaking space.

SUMMARY OF THE INVENTION

The object of the invention is to improve such a breaking device and according to the invention this is attained in a breaking device which is characterized in that a circulating passage has been arranged above a supply conveyor which reaches through a sidewall of the supply passage which circulating passage is formed by a space in the supply passage at one side and a space above the conveying surface of the supply conveyor at the other side whereas a grid has been situated in the circulating space above the supply conveyor. The objects which cannot be broken in one turn will be bounced into the circulating passage by the hammers and will come above the grid, owing to which the objects which are too large to be subjected to a breaking action again will remain on the grid and can be removed through an outlet opening in the wall of the circulating passage. The objects which will fall through the grid will be subjected to a breaking action again as the objects when falling through the grid will fall on the supply conveyor.

It is to be remarked that in a known breaking device a tower has been positioned above the supply passage and the objects which are not already broken can rebound against the walls of the tower in an upwards direction until they pass a partition wall situated in the top of the tower and will fall through a separate outlet passage. Depending on their weight the objects may not be handled properly as less heavy objects cannot rebound in an upwards direction so far that they will enter the outlet passage. This leads to difficulties when the breaking device is to be used for household refuse instead of ore or stones. Another drawback of this device is that rags which will be dragged upwards by the heavy objects will stick on the partition between the tower and the outlet opening, owing to which the passage to the outlet opening will be stopped up. Rags can be easily milled and in a breaking device according to the invention these rags will be subjected to a milling or breaking action again when they come into the circulation channel. This can be easily performed as in the circulating passage a driven roller or conveyor is rotated to propel the rags in a direction parallel to the supply direction of the supply conveyor. The rags which remain in the circulation passage will not come to the grid and will touch the driven roller or conveyor owing to which they will be brought back into the supply passage.

It is advantageous that in a practical embodiment according to the invention the axis of the roller at the end of the supply conveyor and the axis of the driven roller are positioned parallel to the axis of the rotor which is provided with the hammers.

The objects which cannot be broken can be easily removed as according to the invention the grid in the circulating passage runs to a door in the sidewall of the circulating passage.

DESCRIPTION OF THE PREFERRED EMBODIMENT

Figure 1:
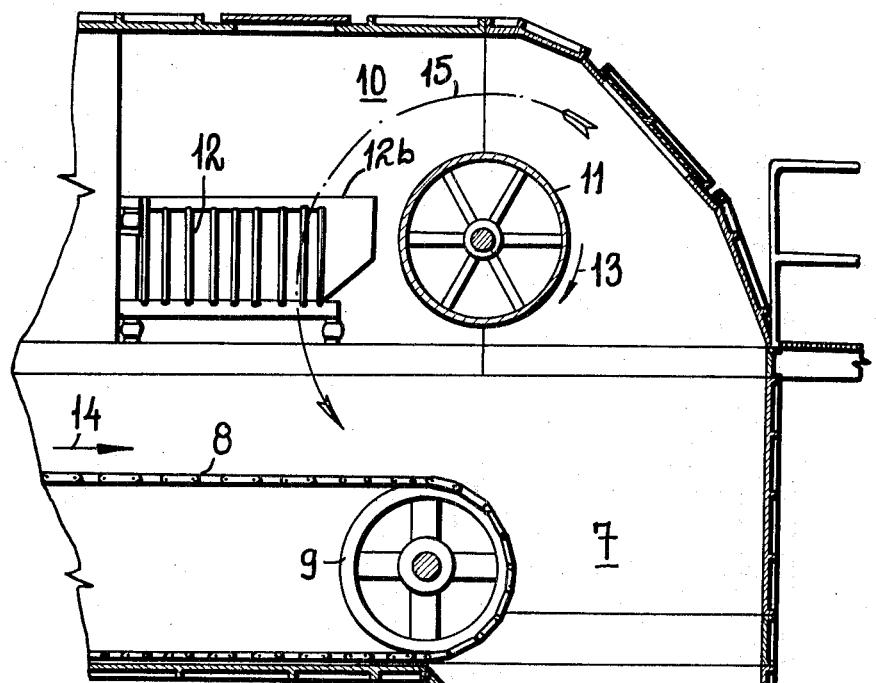
FIG. 1 is a vertical section of a breaking device according to the invention in a plane perpendicular to the axis of the rotor.
Figure 2:
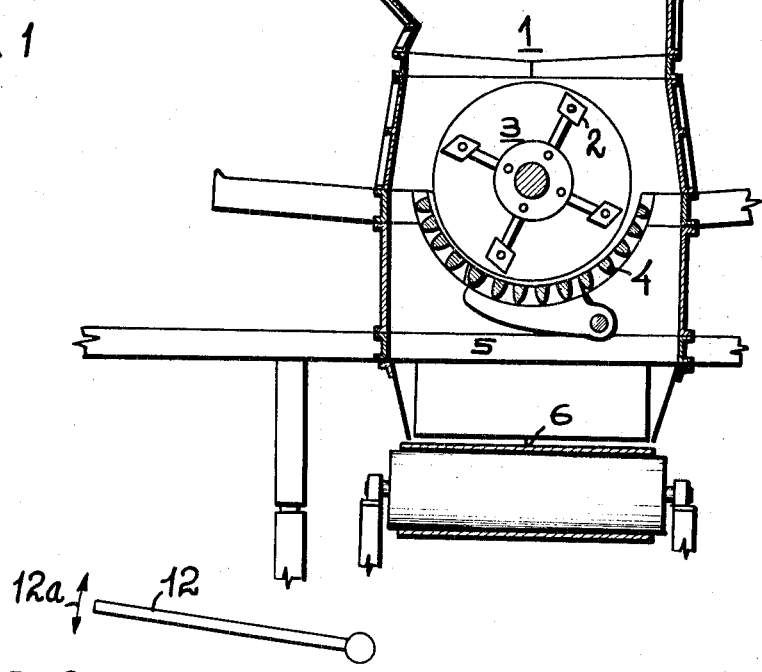
FIG. 2 is an end elevation of a grid which is part of the device, looking toward the left in FIG. 1.

The breaking device according to the invention consists in a breaking space 1 in which a rotor 3 provided with hammers 2 has been positioned. The rotor 3 cooperates with a semicylindrical grid 4, which grid forms a partition between the breaking space 1 and a discharge passage 5. A conveyor 6 has been situated below the discharge passage 5 in order to remove the broken material. A supply passage 7 is provided above the breaking space. The delivery end of a supply conveyor 8 which runs around a roller 9 reaches into the supply passage 7. The scrap or rubble on the supply conveyor 8 will enter the supply passage 7 and will fall down into the breaking space 1 where it will be broken or milled. A circulating passage 10 is arranged in the supply passage 7 above the delivery end of the supply conveyor 8 which circulating passage encompasses a driven roller 11. The circulating passage 10 is interrupted by a grid 12. This grid is adapted to be rocked as indicated at 12a in FIG. 2 and runs towards an opening 12b in the sidewall of the circulating passage 10. This opening for the grid 12 can be closed by means of a flap.

The objects which are not broken and which are upwardly bounced enter into the circulating passage 10 and will fall on the grid 12. When these objects can pass the grid 12 they will fall on the supply conveyor 8 and will be subjected to a breaking action again when they enter the supply passage 7. There will always be a circulating current of objects which are not entirely broken above the supply conveyor 8 in the supply passage 7 when the device is in operation. When the objects in the circulating passage 10 are too large they will remain on the grid 12 and will not be subjected to the breaking action again, and these objects can be removed. Objects having a light weight such as rags will not reach the grid 12 and will fall upon the roller 11 owing to which they will be brought back to the breaking space 1 as the roller rotates in the direction of the arrow 13.

The supply by the conveyor 8 of the scrap has been indicated by an arrow 14, whereas the circulation of the scrap which is to be broken again has been indicated by the arrow 15. In this manner the objects which cannot be broken and are too large in size can be removed from the supply passage 7. The objects which will fall through the grid 12 can be milled independently of their hardness.

I claim:

1. A scrap breaking device having a supply passage for the scrap to be broken, a rotor below the supply passage provided with hammers and rotating around a horizontal axis, a semicylindrical grid below the rotor, and a discharge passage for the broken scrap below the grid, wherein the improvement comprises a horizontal supply conveyor extending into the supply passage and terminating in a discharge end located above the level of the rotor, a circulating passage extending laterally from the supply passage above the supply conveyor, and a second grid extending below the circulating passage and above the supply conveyor to separate the pieces which are large enough to be thrown by the rotor upon and to be retained by the second grid from the pieces which are thrown only high enough to fall upon the supply conveyor.

2. A scrap breaking device according to claim 1, characterized in that a horizontal driven roller is situated in the circulating passage, the peripheral direction of movement at the top of the driven roller being parallel to the direction of feed of the supply conveyor.

3. A scrap breaking device according to claim 2, characterized in that the driven roller is situated at the level of the grid in the circulating passage and above the discharge end of the supply conveyor.

4. A scrap breaking device according to claim 3, characterized in that the supply conveyor at its discharge end passes around a roller, and the axes of such roller and the driven roller are parallel to the axis of the rotor.

5. A scrap breaking device according to claim 1, characterized in that the grid in the circulating passage is situated adjacent to an opening in a sidewall of the circulating passage.